May 2, 1944.   W. B. BOICE ET AL   2,347,764
BAND SAW
Filed June 3, 1941   3 Sheets-Sheet 1

Inventor
William B. Boice
John E. Boice
By Alfred F. Rees
Attorney

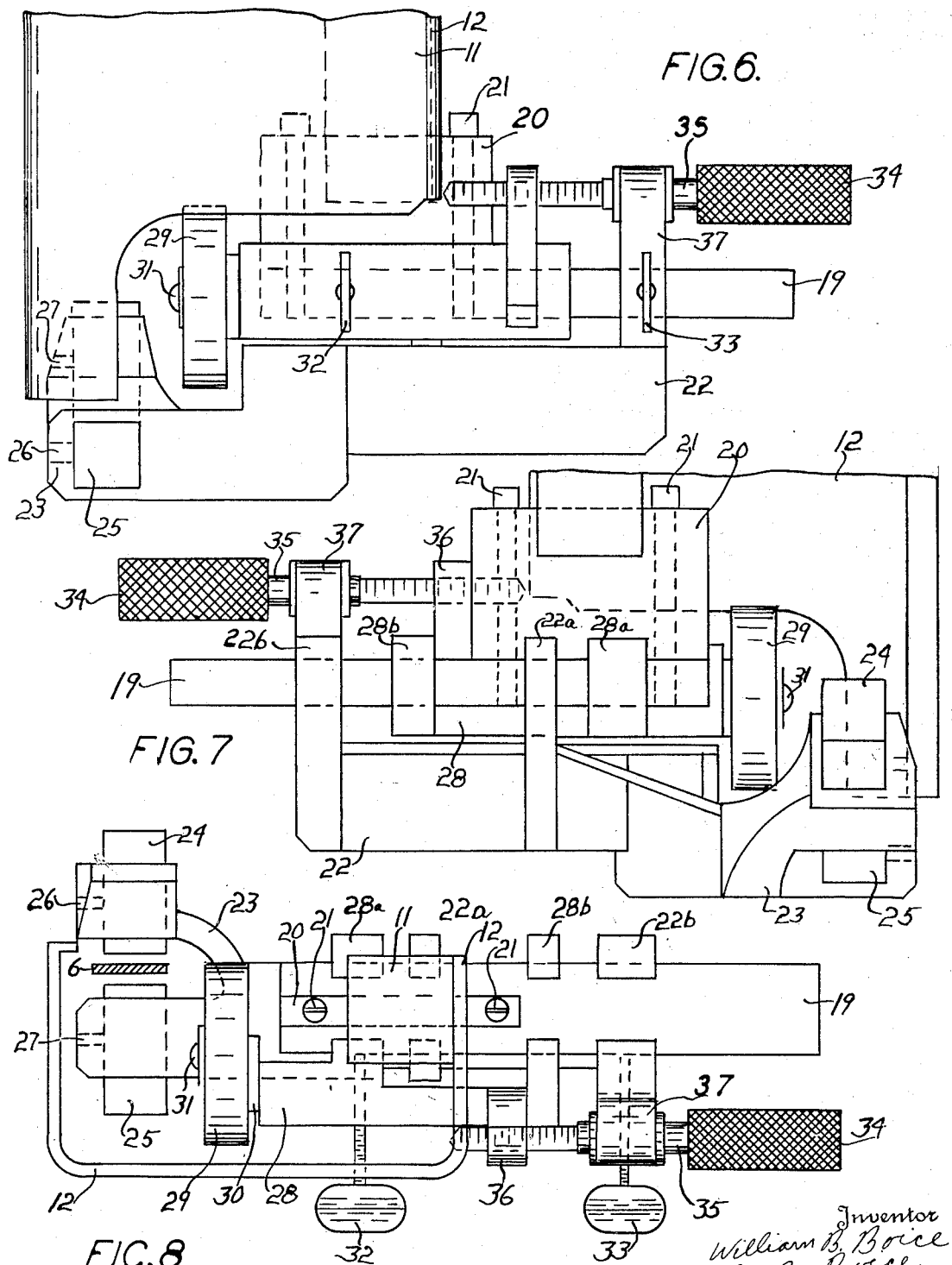

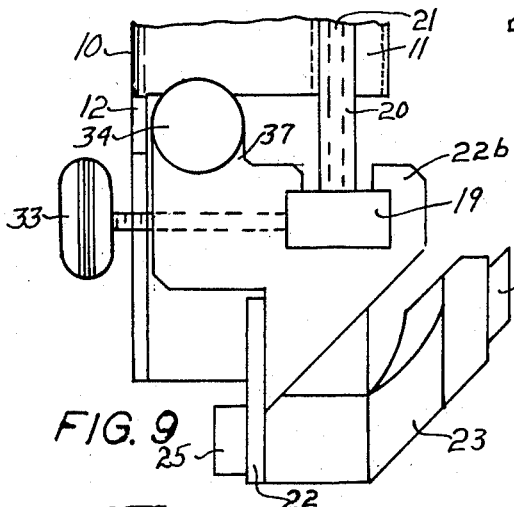
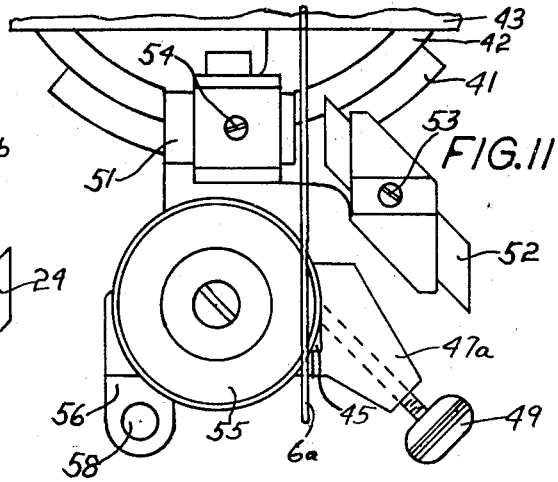
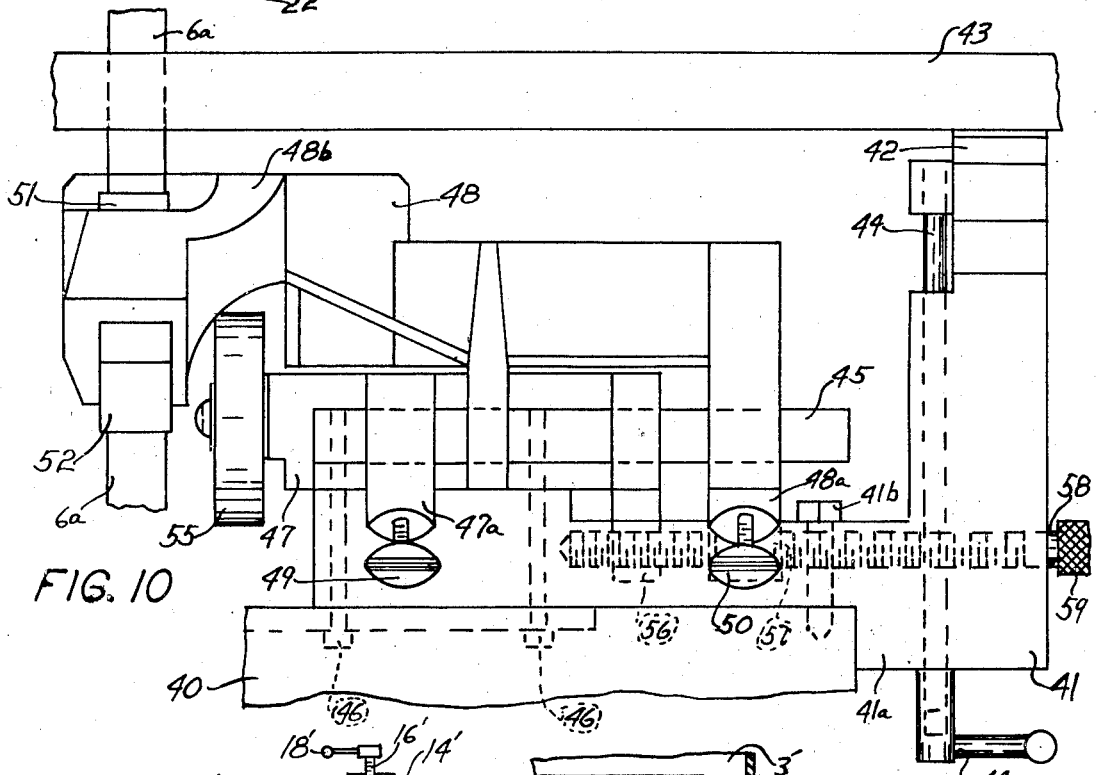
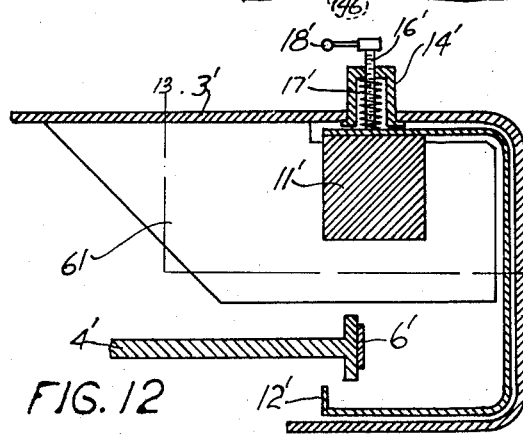
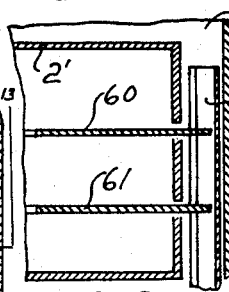

Patented May 2, 1944

2,347,764

UNITED STATES PATENT OFFICE 2,347,764

BAND SAW

William B. Boice and John E. Boice, Toledo, Ohio

Application June 3, 1941, Serial No. 396,434

6 Claims. (Cl. 143—161)

This invention relates to band saws and in its more particular aspects relates to a common support for a telescoping band saw guard and a saw guide.

The object of this invention is to provide in a band saw a common support for a saw guard and for a saw guide.

A further object of the invention is to provide a construction in which the saw is completely enclosed within a guard structure and thereby exposes to view only that part of the saw which is actually being used for a cutting operation.

A still further object of the invention is to provide a construction in which the saw guide and the guard are simultaneously adjusted to the desired height.

A still further object of the invention is to provide a guard construction at the operator's station which substantially surrounds the saw and which telescopes into the wheel guard and which also supports the saw guide for simultaneous vertical adjustment.

Another and still further object of the invention is to provide a combination saw guide and guard construction that is easily slid out of position and which provides a maximum rigidity to the cutting blade in any vertical adjustment of the combined saw guard and guide.

Another and still further object of the invention is to provide a simplified guard and guide construction that reduces the number of parts employed, accelerates the "set up" time and reduces the number of adjustments when changing for varying thicknesses of work.

A still further object of the invention is to provide a saw guide in which some or all of the parts are interchangeable with the guide disposed below the work table.

Another and still further object of the invention is to construct a saw guide in which one guide part is angularly disposed to the other guide to enable it to be interchanged with a corresponding part employed on the guide disposed below the saw table top.

A still further object of the invention is to construct a saw guide that has but one adjusting element and which will still selectively adjust either the guide shoes or the guide roller.

Another and still further object of the invention is to provide a saw guide that will positively guide the saw in all positions of adjustment.

Another and still further object of the invention is to provide a saw guide in combination with a guard support that is particularly adaptable to bring the guide and guard right above the work piece operated upon thereby providing maximum stiffness and operator protection for that portion of the saw performing a cutting operation.

A still further object of the invention is to provide a saw guide that uses a minimum number of parts thereby reducing the cost of manufacture and assembly.

Another and a still further object of the invention is to provide a one-piece telescoping guard mounted on a support securable to the machine frame and which support holds the saw guide; the two structures are so constructed and arranged that the guard encloses the saw guide to completely guard the saw.

Other and further objects of the invention will occur to those skilled in the art to which this invention pertains as the description proceeds which taken in connection with the accompanying drawings sets forth the preferred embodiment of the invention but such disclosures are not to be taken as a limitation of the invention which is limited only by the appended claims; and any and all modifications, alterations and variations of construction coming within the spirit and scope are deemed to be included herein.

In the drawings:

Figure 6 is an elevational view of the saw guide taken from the operator's side.

Figure 7 is an elevational view of the reverse side of the saw guide.

Figure 8 is a plan view of the guard and guide assembly.

Figure 9 is an end view of the devices shown in Figures 6, 7, and 8.

Figure 10 is a side elevational view similar to Figure 7 but modified to show the guide mounted below the work table.

Figure 11 is an end elevational view of the structure shown in Figure 10.

Figure 12 shows a modified structure similar to Figure 4.

Figure 13 is a section view taken along the line 13—13 of Figure 12.

Figure 1:
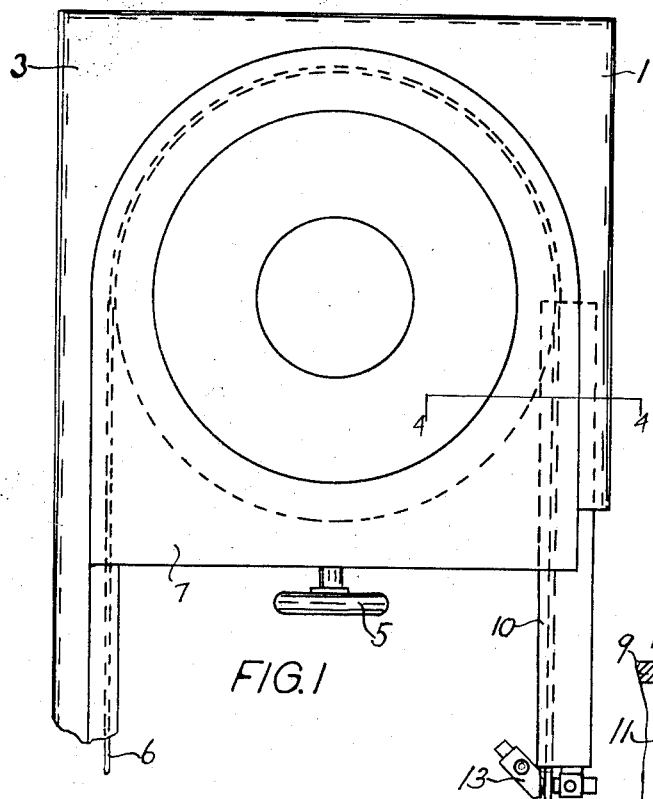
Figure 1 is the front side elevational view of the upper portion of a band saw.
Figure 2:
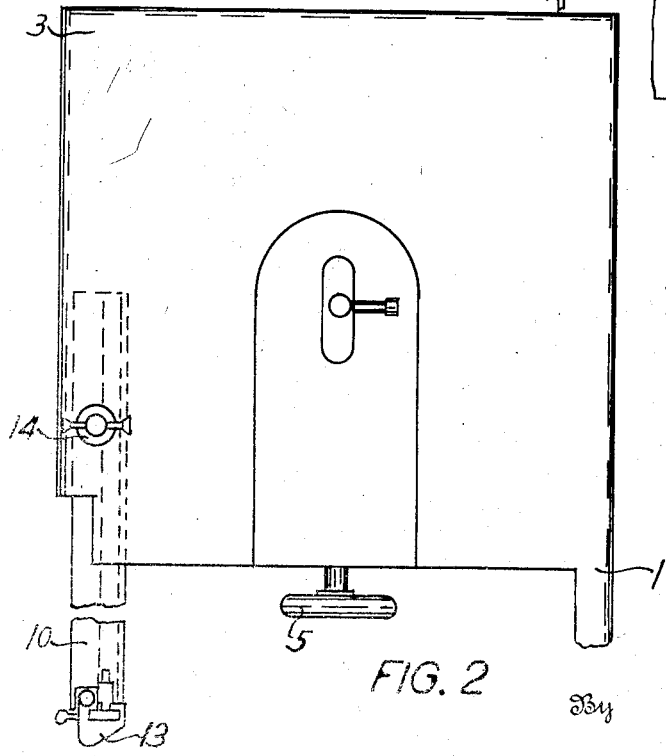
Figure 2 is a view similar to Figure 1 but showing the reverse side of the machine.

Band saws in the past have been constructed with saw guards that terminate a considerable distance above the work table or surface and have provided no protection to the operator for the saw between the work table top and the guard. A saw guide customarily provided below the guard afforded some protection but limitations of construction limited the closeness with which the guide could be put to the work piece. The applicants have provided a guard that telescopes or slides in the guard surrounding the band saw head and that supports a saw guide. The entire combination is supported on a rod or bar support that slides vertically with respect to the guard supported on the band saw head and is so arranged that vertical adjustment of the rod or bar adjusts both guard and guide and brings both immediately above the work and encloses the saw a maximum amount and provides a maximum of support for the saw during the cutting operation, and which is easily slid out of the way when not needed or when replacing work.

The physical embodiment of structure accomplishing the results and objects described above is set forth in the band saw head and guide structure detailed on the attached drawings in which 1 indicates the band saw head and wheel guard. The head comprises a frame structure 2 which has attached thereto a sheet metal cover 3. The frame structure also supports a band saw wheel 4 which is rotatably mounted in bearings (not shown) supported in frame 2 and adapted for vertical adjustment by means of hand wheel 5 in order to keep saw 6 properly tensioned.

The sheet metal casing 3 is adapted to completely surround the wheel 4 except for an opening on the front side of the machine through which access may be had to the wheel 4 and which is guarded by means of an appropriate cover 7 that may be hinged or otherwise swingably secured to the band saw head.

The sheet metal cover 3 extends to the right of the frame 2 to form a substantially tubular opening or extension 8 which is shown as being of a generally rectangular shape although it could assume a variety of shapes. The frame 2 has a plurality of brackets or extensions 9, 9 secured thereto or integral therewith which extend into the tubular opening or extension 8. These brackets or extensions 9, 9 are adapted to form a bearing or backing for the vertical motion of the combination guide and guard structure 10. Brackets 9, 9 are appropriately formed or notched to receive portions of the element 10 such that it may be moved vertically and axially of the extension or opening 8 to adjust the guard and guide structure 10 and thereby move it toward or away from a work piece supported on a table (not shown). The general organization of the machine is shown in a companion application S. N. 402,014, filed July 11, 1941.

The element 10 previously described as adjustable axially relatively of the extension 8 comprises a bar member 11 to which is secured a channel shaped guard member 12 having one leg thereof secured to the bar 11; each of the elements 11 and 12 being considerably greater in length than they are in width. The member 12 is somewhat U shaped as shown in the illustration but the ultimate shape of the element 12 is determined by the particular shape of the tubular extension 8 and in any event extension 8 and member 12 are complementary to each other.

The bar element 11 has secured thereto a saw guide 13 which will be more specifically described elsewhere in the specification. It comprises briefly a pair of relatively stationary saw guides to prevent flexing of the saw blade 6 and also contains an adjustable backing guide which is in the form of a roller.

Means have been provided in the form of a locking element 14 which is adapted to hold the element 10 in any adjusted position. The locking element 14 comprises a shouldered and counterbored nut element 15, the shouldered portion of which fits behind or back of wall element 3. A screw element 16 is threaded over a portion of its length and is threadably engaged in the nut 15 and has its one end in engagement with element 10 against the wall portion of channel member 12 which is supported on the bar 11. A spring 17 is concentrically disposed on the screw element 16 and has its one end engaging one of the wall portions of element 10 and the other end of the spring is in engagement with one end of the nut element 15; the counterbore of the nut element 15 providing a housing for the spring 17. A handle 18 is slidably engaged with an enlarged end of screw 16 whereby the said screw 16 may be rotated and locked against element 10 by pressing bar 11 in engagement with bracket 9, 9.

Attention at this point is invited to the fact that the spring 17 is tensioned such that it will exert enough pressure on the element 10 and against brackets 9, 9 to hold element 10 against sliding motion in the tubular extension 8 during periods of adjustment or in other words producing sufficient friction between bar element 11 and the notches in brackets 9, 9 in which the bar 11 slides such that the gravitational force on the element 10 will be overcome thereby enabling the operator to quickly adjust the element 10 and be relieved of the task of holding the said element 10 while the locking screw 16 is turned home. Attention is further invited to the fact that the shouldered portion of nut 15 prevents an axial separation of the nut 15 and the wall portion 3 thereby assuring the operator that the locking mechanism 14 will always be in a serviceable condition. Locking element 14 is arranged in proximity to brackets 9, 9 and is preferably disposed between them.

Reference is now made to Figures 6, 7 and 8 which show a more detailed construction of the saw guide that is secured to and rigidly associated with the element 10. The saw guide originates in a track element 19 rigidly secured to the element 10 and in particular to the bar 11 which constitutes the basic support for the channel member 12 and the saw guide 13. The mode of securing track element 19 to bar 12 is by medium of a spacer element 20 that is welded or otherwise secured to the bar 11. The element 20, more preferably called a spacer, has two apertures therein through which a pair of screws 21, 21 are passed and which are threaded to the track element 19 which constitutes the base of the saw guide 13.

Slidably mounted on the track element 19 is a first frame 22 which has a pair of slideways 22a and 22b arranged thereon which fit over the track element 19. Arranged at one end of the frame 22 is a forked holding element 23 integral with the frame 22 that adjustably receives a pair of rigid guide elements 24 and 25. These guide elements are adapted to prevent a flexing of the saw blade 6 as it passes through the forked end 23 of the frame 22 between said guide elements 24 and 25. A pair of locking screws 26 and 27 are provided in each of the forks to adjustably secure the guides 24 and 25 in position.

A second frame 28 is slidably arranged on the track element 19 and is provided with slideways 28a and 28b which are spaced alternately to the guides 22a and 22b of the frame element 22. The frame 28 has arranged at one end thereof, on an appropriate bracket 30, a backing or roller guide 29. The roller guide 29 may be removed from the bracket by means of screw element 31.

Means have been provided for adjusting the roller guide 29 and the stationary guides 24 and 25 relatively to each other and to the track element 19 and bar 11 and to that end the frames 28 and 22 are adapted to be locked to the track element 19 by means of locking screws 32 and 33; the latter screws 32 and 33 being placed respectively in frames 28 and 22 and always kept in a "turned home" condition. Each of the frames 28 and 22 have ears 36 and 37 respectively mounted thereon that are bored, each of which bores are disposed on the same, or have a common, axis.

The means for sliding the guides 25, 24 and 31 relatively to each other and to the saw 6 comprises a screw element 35 that is rotatably received and held in the ear 37 and is threadably received in the ear 36, the screw being threaded at its one end as shown in the several figures of the drawings. The other end of the screw 35 has a knurled handle 34 which facilitates the turning of the screw 35. When it is desired to adjust the frames supporting the guide elements relatively to the track element 19 and the bar 11 it is necessary that one of the locking screws 32 or 33 be released. Whichever frame is to be adjusted has its locking screw released thereby permitting the frame to slide relatively of the track element 19 upon rotation of screw 35 by its handle 34. To specifically illustrate; assume that it is desired to adjust the frame 28 relatively of the track element 19 then screw 32 is released and screw 35 rotated which by reason of its threaded engagement with the ear associated with frame 28 urges the frame along the track element 19. Now assume that it is desired to adjust the frame 22. Screw 33 is released whereupon the screw 34 is rotated and since frame 28 is locked to the track element 19 it is evident that the axial motion of the screw 35 will slide the frame 22 along the track element 19 by reason of the fact that the screw is rotatably associated with the ear 37. After each adjustment each of screws 32 or 33 is turned home to lock each of the frames 22 and 28 in any selected position of adjustment.

The guard 12, it will be observed, completely protects the saw and guides leaving no part of the saw exposed above the guide. The assembly 10 is adjusted such that it just clears the work and then furnishes maximum rigidity to the saw and maximum safety to the operator.

Attention is at this point invited to the fact than one of the forked portions of frame 22 which holds guide element 24 is disposed at an angle of approximately 45° to the longitudinal dimension of the frame or to the longitudinal axis of guide 25. Advantage is taken of this particular constructional feature in making this part directly interchangeable with a corresponding part of a saw guide disposed below the table top. The assembly of the slightly modified lower saw guide and its method of mounting on the base of the machine is shown more particularly in Figures 10 and 11. The complete machine assembly is shown in the companion case referred to above.

In Figure 10, 40 indicates a portion of a bracket mounted on an appropriate base (not shown) of the band saw, on which a trunnion 41 is rigidly mounted by means of one or more screws 41b. The trunnion 41 receives a complementary element 42 secured to table top 43 and bolt 44 and nut 44a serves to lock elements 41 and 42 together. This structure forms subject matter explained in greater detail in the companion case identified above. The trunnion 41 has an extension 41a, through which screw 41b passes, resting on bracket 40 and serves a purpose similar to spacer element 20 described in connection with Figures 6, 7, and 8. The element 41a is slightly enlarged at one end as shown in Figure 10.

The shouldered or enlarged portion of 41a has mounted thereon the track element 45 that is made secure thereon by means of screws 46, 46 passing through appropriate apertures in the portion 41a. Mounted on track element 45 are two frame members 47 and 48 that are substantially identical in construction with elements 22 and 28 described above. In actual manufacture each of the portions 47a and 48a on the frames is originally cast with an angularly extending portion adapted to receive the corresponding one of lock screws 49 and 50 that engage track element 45 to lock the frame in position. In the construction of parts 22 and 28 these small extensions are milled off to present the structure of Figures 6-9. By pursuing this expedient one mold or die of each part will suffice for all parts and therefore each corresponding part may be selectively employed on either guide by allowing the extension to remain or milling it off. As an actual matter of fact extensions 47a and 48a need not be provided at all but only serve a convenient expedient to better receive and locate screws 49 and 50 in the lower guide.

The frame 48 is provided with a forked end 48b in each of the prongs of which a rigid guide 51 or 52 is supported and held by screw 53 or 54 respectively. The frame 47 has roller guide 55 rotatably mounted thereon in a manner similar to guide 29 on frame 28. Cutter or saw 6a operates between guides 51 and 52 and against the roller 55 in the manner and for the purpose more particularly described in connection with the description of Figures 6, 7, and 8. Attention is again called to the fact that one of the guides is disposed at an angle of approximately 45° to the other. This construction enables the guides to be placed immediately against the work or against the bottom of the table top. It also permits the cutting of a thicker piece of stock when the table is tilted at an angle from the horizontal.

Frame 47 has an ear 56 integrally associated therewith and frame 48 has an ear 57 thereon, shown partially in dotted lines in Fig. 10, and in which screw 58 is rotatably mounted. The screw 58 is threadably associated with ear 56. A knurled handle 59 is secured to screw 58 to rotate the latter. The association of the immediately foregoing structure is similar in construction, function and purpose to the corresponding ear and screw structures of Figures 6, 7, 8, and 9. The mode of operation and adjustment is likewise similar to that set forth in connection with aforementioned figures. Handle 59 for convenience is brought to an exterior edge of table 43.

It is evident therefore that by a slight alteration the parts are interchangeable and that two molds or dies suffice to make all the parts and a small amount of machining is all that is necessary to selectively prepare the parts for use on either the upper or the lower saw guides.

Figure 3:
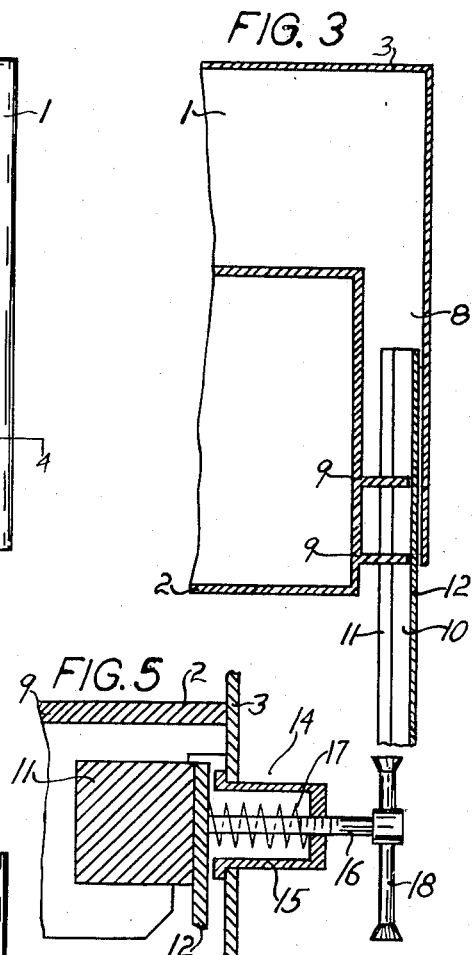
Figure 3 is a section view taken substantially along the line 3—3 of Figure 4.
Figure 5:
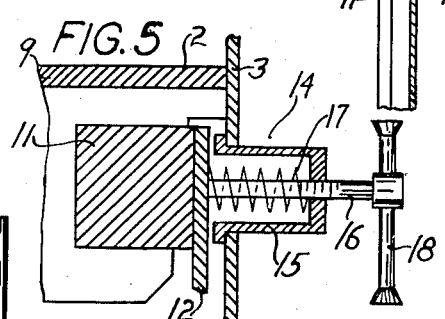
Figure 5 is an enlarged detail view of the locking means for the guard.
Figure 4:
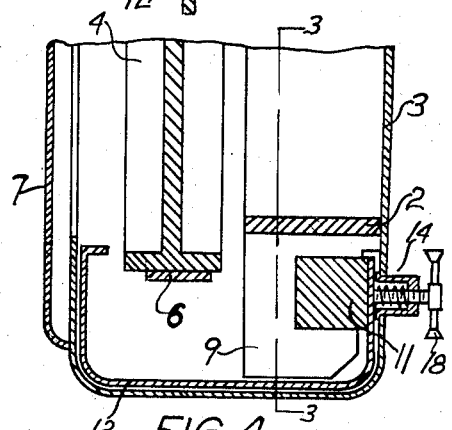
Figure 4 is a view taken substantially along the line 4—4 of Figure 1.

Figures 12 and 13 show a modification of the combination of Figures 3 and 4. In the latter figures the brackets 9, 9 are integrally associated with the frame 2 whereas in Figures 12 and 13 the brackets 60 and 61 are extended and secured directly to the wall 3'. All of the parts function and operate exactly as those described in connection with Figures 3, 4 and 5 and the numbers of the parts occurring in Figures 12 and 13 and that also occur in Figures 3–5 bear primes.

That which is considered new, novel and useful and which is sought to be protected by Letters Patent of the United States is as follows:

1. In a band saw guide mechanism; a bar element; a second bar transversely disposed to said first bar and secured thereto at one end; a pair of block guides adjustably mounted on said second bar; a roller guide adjustably mounted on said second bar; a single means adapted to selectively adjust both sets of guides; and alternate means one for each adjustable guide to lock said guides on said bars, one of said alternate means being unlocked when said block guides and said roller guide are adjusted relatively of each other and said bars.

2. In a band saw guide; a base plate; a frame slidably mounted on said base plate and supporting one set of guides; a second frame mounted on said plate and supporting a second guide; an adjusting screw connecting said frames and alternate locking means on each of said frames adapted to selectively lock them to said base plate comprising a locking screw for the one frame and a locking screw for said second frame.

3. In a device as defined in claim 2 in which said adjusting screw rotates relatively to one of said frames and is threaded into the other of said frames.

4. In a band saw unit; an elongated bar; a saw guide support rigidly secured to said bar; a pair of frames relatively slidable on said guide support; a common means to selectively adjust said frames on said guide support; saw guides mounted on said frames; and alternate locking means, one on each frame, to lock said frames and guides in any adjusted position on said guide support, said common means selectively moving one of said frames when the other is locked.

5. In an interchangeable saw guide; a track element securable to a band saw frame element; a guide slidable on said track, said guide comprising a pair of guide blocks mounted in sockets formed in said frame element, one of said guide blocks disposed at an angle of 45° to the other, said angularly disposed guide blocks making the frame element selectively usable as an upper or lower saw guide; a roller guide slidable on said track element interchangeably usable on either an upper or lower guide track; common means to selectively adjust the guides along the said track; and alternate locking means, one on each guide, to selectively lock said guides to said track element, said common means moving one of said guides along said track when the other is locked to said track.

6. In a saw guide that is employable as either an upper or a lower guide comprising; a track element selectively usable on the upper or lower guide; a first frame slidably mounted on said track and having two guide blocks one disposed at an angle of approximately 45° to the other, said angularly disposed guide block rendering the frame usable on the upper or lower guide and permitting the guides to be adjusted in immediate proximity to the work or the bottom of the saw table; a second frame slidably mounted on said track and having a roller guide in proximity to said guide blocks, said second frame usable on the upper or lower guide; a common means to selectively adjust either of said frames along said track and means to lock each of said frames to said track, comprising alternate locking means, one on each frame, to selectively lock said frames to said track element, said common means moving one of said frames along said track when the other is locked to said track.

WM. B. BOICE.
JOHN E. BOICE.